United States Patent [19]

Pritchett

[11] Patent Number: 4,807,785
[45] Date of Patent: Feb. 28, 1989

[54] LIQUID DISPENSING DEVICE

[76] Inventor: Eddie J. Pritchett, 401 W. Stevens, Apt. D., Santa Ana, Calif. 92707

[21] Appl. No.: 80,802

[22] Filed: Aug. 3, 1987

[51] Int. Cl.⁴ ............................................. G01F 11/28
[52] U.S. Cl. .................... 222/442; 222/453; 222/525; 222/524; 222/484
[58] Field of Search ............... 222/442, 453, 451, 425, 222/525, 524, 484, 523, 522, 485, 532, 531, 537, 559, 476, 501, 207, 212, 450

[56] References Cited

U.S. PATENT DOCUMENTS

| | | | |
|---|---|---|---|
| 689,468 | 12/1901 | Dobbyn | 222/453 X |
| 2,655,290 | 10/1953 | Mansperger | 222/453 X |
| 3,109,546 | 11/1963 | Baruh | 222/453 X |
| 3,197,091 | 7/1965 | Millard | 222/522 |
| 3,655,105 | 4/1972 | Johns | 222/484 |
| 3,658,216 | 4/1972 | Schwartzman | 222/453 |
| 4,162,749 | 7/1979 | Bennett | 222/522 X |
| 4,240,570 | 12/1980 | Brown et al. | 222/442 |
| 4,487,342 | 12/1984 | Shy | 222/484 X |

FOREIGN PATENT DOCUMENTS

| | | | |
|---|---|---|---|
| 419492 | 3/1947 | Italy | 222/453 |
| 571739 | 9/1945 | United Kingdom | 222/450 |

*Primary Examiner*—Joseph J. Rolla
*Assistant Examiner*—David H. Bollinger

[57] ABSTRACT

A liquid dispensing device is provided which dispenses a given amount of liquid from a bottle container which comprises (1) a bottle cap removably affixed to the bottle; (2) a spout tube movable within said cap and located both within and outside of said cap; (3) a handle affixed to the exterior portion of said spout tube and suitable to move said tube as desired within said cap; (4) a series of apertures within said spout tube; (5) a valve seat located at the end of said tube opposite to the end where said handle is located and located within said cap; and (6) an air valve tube removably located within an aperture of said cap. The tube is pushed into the cap and container by the operator utilizing the handle, allowing liquid to flow about the valve seat into the chamber of the cap. The tube is thereafter drawn outward, permitting the valve seat to come into contact with the wall of the cap, sealing and filling the cap chamber. The tube is further withdrawn so that apertures located in an inner wall of the cap chamber are aligned with openings in the tube allowing fluid to flow from the cap chamber into the tube. Simultaneously, an air valve tube is withdrawn from the wall of the cap, allowing air to pressure liquid from the cap chamber into the tube and out of the spout to the designated location.

1 Claim, 1 Drawing Sheet

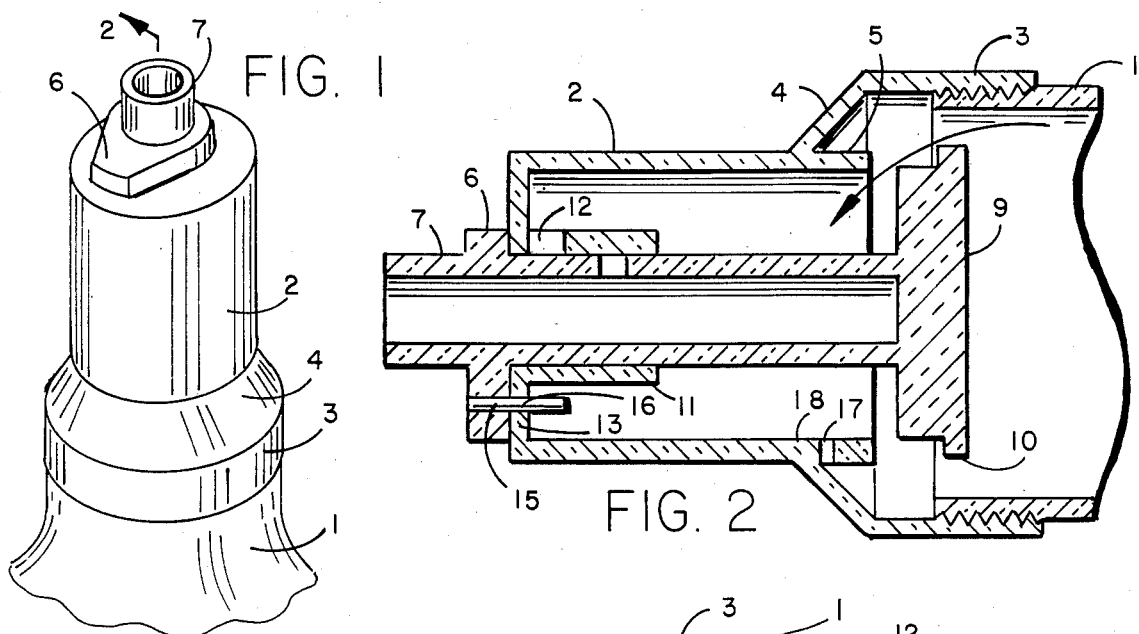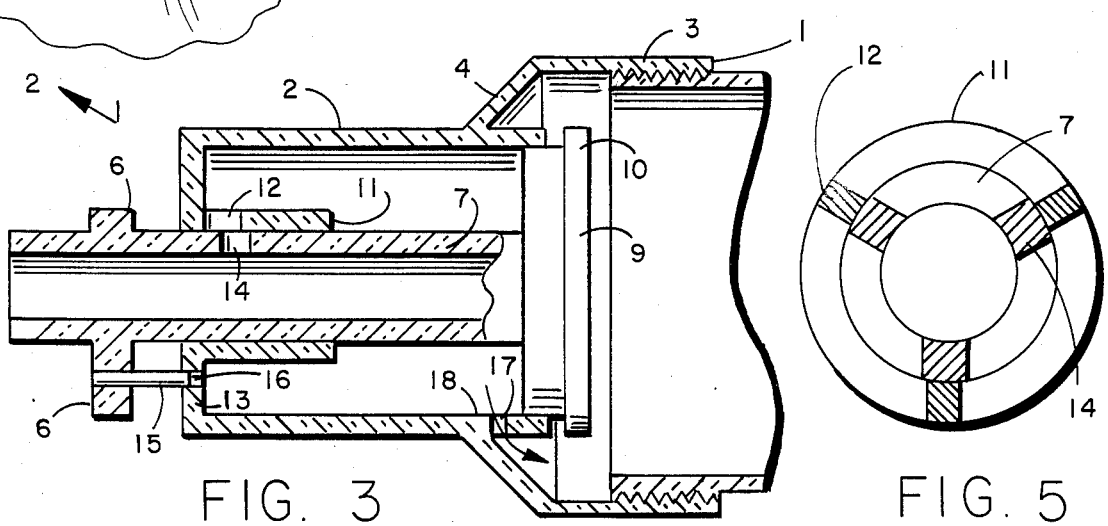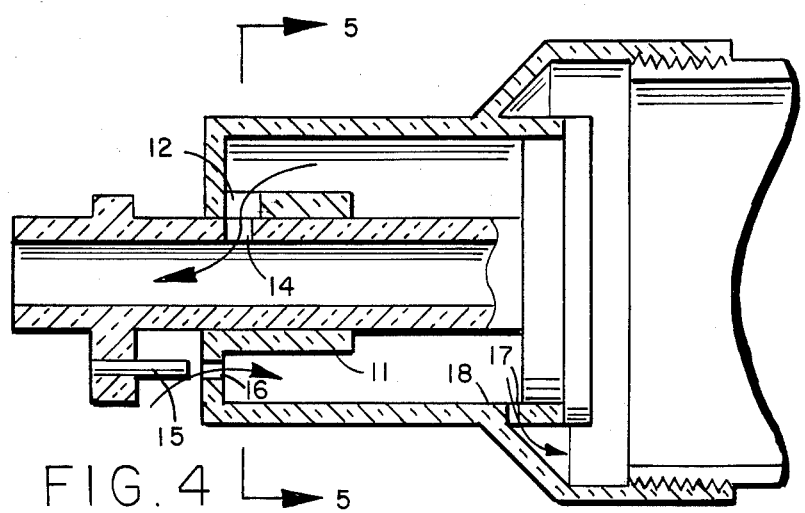

LIQUID DISPENSING DEVICE

BACKGROUND OF THE INVENTION

The invention relates to dispensing a determined and measured quantity of liquid from a bottle or other container.

It is common to store liquid in plastic or glass bottles. For example, liquid soap, for washing clothes, is now commonly stored in plastic bottles. The liquid soap is dispensed by pouring a measured amount into a cap removably affixed to the bottle, and thereafter into the washing machine. The disadvantage of such operation is obvious in that one must remove the cap, pour the liquid soap into the cap and thereafter pour the liquid from the cap into the washing machine.

Liquid dispensing devices have been conceived whereunder determined amounts are dispensed without the above dual pouring operations, such as the device described in U.S. Pat. No. 3,190,505 to Arbitman. Such device suffers the disadvantage of requiring the squeezing of the particular bottle and bottle cap with multiple moving parts. Thus the particular cap or container has to be flexible material, thus excluding the use of glass bottles or certain desirable plastic bottles. Applicant has conceived and reduced to practice a novel dispensing system wherein liquid can be dispensed from any type container in a pre-determined quantity, without the necessity of a separate measuring device for operation.

The object of the invention is to provide a device for dispensing liquid from a container in a pre-determined volume.

A further object of the invention is to provide a method of dispensing liquid from a container in a set volume without the necessity of a separate pouring operation.

Other and further objects of the invention will be apparent from the following description.

DESCRIPTION OF THE DRAWINGS

The novel device and method of the invention can be best illustrated from a view of the following drawings.

FIG. 1 shows a perspective view of a container to which is attached a bottle cap.

FIG. 2 is a side view of the device of the invention with the location of the tube and valve in the "fill" position.

FIG. 3 is another side view of the invention with the tube and valve in the "intermediate position".

FIG. 4 is still another side view of the invention with the pouring tube in the "pour" position.

FIG. 5 is an in view of the invention showing the location of the apertures of the wall of the cap and the spout tube.

DETAILED DESCRIPTION OF THE DRAWINGS

Referring the FIG. 1, there is shown a bottle or other type container 1. As indicated hereinabove, the container 1 can be made of glass, plastic or any other material, and need not be of a material that can be "squeezed" to allow fluid to flow from such container.

Attached to the container 1 is a bottle cap composed of a cylinder portion 3 immediately in contact with container 1, a tapered portion 4, and a main cylinder 2. Such cap can be attached to the container 1 by any method known in the art and, in fact, need not be, but is preferrably removably attached so that the internals of the cap can be cleaned and/or repaired.

FIG. 1 shows a spout tube 7 which is contained both inside and outside the cap. Surrounding tube 7 is a handle 6 which is integral with tube 7, or in intimate contact therewith, so that movement of the handle by the operator simultaneously moves tube 7. As shown, handle 6 is oblong, however, any handle affixed to tube 7 allowing tube 7 to be moved is suitable.

Referring now to FIG. 2, the cap is shown in side view attached to container 1. The cap has an end wall portion 13 and inner wall 11. Spout tube 7 is shown inserted in the cap with handle 6 resting on the end portion of the cap. The inner wall 11 has a series of openings, i.e., 1 to 10, preferably 3 to 6 apertures 12. Tube 7 has a like number of apertures 14.

Attached to the internal end of tube 7, opposite to the handle end, is valve seat 9. Seat 9 is located within the cap. The ends of valve seat 9 contain an L-portion 10 so that the valve seat 9 can firmly rest on a portion of the cap in order to seal one chamber of the cap from the remainder of the cap as shown in FIG. 4.

Attached to the handle 6 is a tube plug 15, which is placed in an opening 16 of the bottle cap. Tube 15 can either be hollow or solid, but must be sealed or imbedded in the handle 6 so that liquid does not flow from the chamber of the cap through handle 6. Tube 15 acts as a plug for the hole 16 of the cap.

Opening 17 is shown to cap wall 2 and which allows over flow liquid to flow back to container 1. FIG. 3 shows the identical elements described above, as does FIG. 4. FIG. 5 shows an end view of hole 12 in the inner wall 11 and hole 14 to the tube 7.

OPERATION OF THE INVENTION

As indicated hereinabove, FIG. 2 shows the dispensing device in the "fill" position. During this phase, liquid from the container 1 flows about valve seat 9 and into the chamber defined by the cap. The tube is pushed inwardly utilizing the handle so that the handle rests against the cap end wall with the valve seat 9 in the innermost position allowing fluid to flow about the valve seat. Apertures 12 and 14 are not aligned so that fluid cannot flow into the chamber defined by tube 7.

FIG. 3 shows the dispenser in the "intermediate" position. The tube is partially withdrawn from the cap and holes 12 and 14 are aligned in position. Valve 9 engages the end 5 of the main cylinder of the cap, cutting of further liquid flow from container 1. In the intermediate position, liquid does not flow into tube 7 because the pressure inside tube 7 exceeds that within the chamber of the cap. After the tube 7 is located in the intermediate position, the amount of liquid to be dispensed is defined or determined.

FIG. 4 shows the device in the "pour" position. The tube 7 is further removed but not totally removed from the interior of the cap. The tube plug 15 is removed from aperature 16, thus allowing air to pressurize the liquid in the chamber of the cap. Liquid thus flows through aligned apertures 12 and 14 and into the interior of tube 7, out the spout and into the designated location.

After all of the liquid has been removed, the handle 6 is pressed thus placing tube 7 back in the "fill" position shown in FIG. 2 for another series of operations.

There is shown a hole 17 in an internal portion 18 of the cap and which serves as "pressure reliever" so that liquid flows through said hole and back into the container 1 if excess liquid is in the chamber defined by the cap main cylinder.

As discussed, measured amounts of liquid can be readily dispensed without the necessity of removing the cap and without the necessity of squeezing the cap or bottle 1, as is required in prior devices. Container 1 can be composed of any material, such as glass and metal, as well as plastic. The cap is preferably removably affixed to container 1, but need not be.

As indicated, the operation of the invention depends on the function of the plug 15, which allows air to enter the chamber and force liquid into the tube 7. Such plug can be made of any suitable material, however, such plug is preferably made of glass or hardened plastic. The plug may be either solid or hollow, but cannot be made of or located so that air can flow into the chamber during the "fill" or "intermediate" positions.

I claim:

1. A liquid dispenser device for dispensing a predetermined volume of liquid comprising:
    (a) a container for storage of liquid;
    (b) a cap affixed to said container comprising a cylinder portion for engaging said container, a tapered portion connecting a main cylinder with said cylinder portion and where said main cylinder defines a chamber;
    (c) A hollow tube inserted in said cap through a central aperture in an end wall of said main cylinder, such that a portion of said hollow tube is within said cap and a portion of said hollow tube is outside said cap;
    (d) a handle affixed to said hollow tube on said portion of said hollow tube outside of said cap;
    (e) one or more openings formed in said hollow tube on said portion within said cap;
    (f) a valve seat affixed to the end of said portion of said hollow tube within said cap;
    (g) a plug tube affixed to said handle which is removably inserted within an opening in the end wall of said main cylinder;
    (h) an inner wall within said cap surrounding said central aperture in contact with the exterior surface of said hollow tube;
    (i) one or more openings in said inner wall;
    (j) said hollow tube being slidable within said inner wall and cap between a first position where said valve seat is disengaged from an interior end portion of said main cylinder to permit liquid flow from said container into said chamber and where said openings in said hollow tube and said inner wall are non-aligned, and a second position where said valve seat is engaged with said interior end portion of said main cylinder to prevent flow from said container to said chamber and where said openings in said hollow tube and said inner wall are aligned and where said plug tube is removed from said opening in said cap, so that upon such removal of said plug tube from said opening, liquid is dispensed from a discharge outlet in said portion of said hollow tube outside said cap.

* * * * *